(12) United States Patent
Reyes et al.

(10) Patent No.: US 12,047,390 B2
(45) Date of Patent: Jul. 23, 2024

(54) DEVICE CONNECTIVITY POWER CONTROL

(71) Applicant: KYNDRYL, INC., New York, NY (US)

(72) Inventors: Joseph Reyes, Pelham, NY (US); Christopher C. Bode, Cary, NC (US); Marci Devorah Formato, Clintondale, NY (US); Andrew S. Kronstadt, Pensacola, FL (US)

(73) Assignee: KYNDRYL, INC., New York, NY (US)

( * ) Notice: Subject to any disclaimer, the term of this patent is extended or adjusted under 35 U.S.C. 154(b) by 555 days.

(21) Appl. No.: 15/929,497

(22) Filed: May 6, 2020

(65) Prior Publication Data

US 2021/0352085 A1    Nov. 11, 2021

(51) Int. Cl.
*H04L 29/06*       (2006.01)
*H04L 9/40*        (2022.01)

(52) U.S. Cl.
CPC .......... *H04L 63/1408* (2013.01); *H04L 63/06* (2013.01); *H04L 63/1441* (2013.01); *H04L 63/20* (2013.01)

(58) Field of Classification Search
CPC . H04L 63/1408; H04L 63/06; H04L 63/1441; H04L 63/20
USPC .......................................................... 726/22
See application file for complete search history.

(56) References Cited

U.S. PATENT DOCUMENTS

| | | | |
|---|---|---|---|
| 4,744,097 A * | 5/1988 | Haruhara | G07G 1/14 365/228 |
| 9,049,195 B2 | 6/2015 | Sack | |
| 9,642,051 B2 * | 5/2017 | Lund | H04W 12/08 |
| 9,693,276 B1 * | 6/2017 | Wuellner | H04W 48/18 |
| 10,460,117 B2 | 10/2019 | Camiel | |
| 10,509,906 B2 | 12/2019 | Gupta | |
| 10,530,580 B1 | 1/2020 | Walker | |

(Continued)

OTHER PUBLICATIONS

Sridhar, "Cyber-Physical System Security for the Electric Power Grid", Jan. 2012, IEEE, pp. 210-222 (Year: 2012).*

(Continued)

*Primary Examiner* — Taghi T Arani
*Assistant Examiner* — Gregory A Lane
(74) *Attorney, Agent, or Firm* — Zilka-Kotab, P.C.

(57) ABSTRACT

A method, system, and program product for controlling power associated with connectivity between devices is provided. The method includes scheduling a copy function associated with copying data from a production hardware device to a secure hardware device at a specified time period. A first hardware connection between the production hardware device and a production network associated with the production hardware device is disabled during the specified time period and a second hardware connection between the production hardware device and the secure hardware device is enabled. A subsequent copy function is enabled for copying the data from the production hardware device to the secure hardware device. The second hardware connection between the production hardware device and the secure hardware device is disabled after the copy function has completed. In response, the first hardware connection between the production hardware device and the production network is enabled.

20 Claims, 6 Drawing Sheets

(56) References Cited

U.S. PATENT DOCUMENTS

| | | | |
|---|---|---|---|
| 10,986,043 B1* | 4/2021 | Schmidtke | H04L 49/355 |
| 2006/0002331 A1 | 1/2006 | Bhagwat | |
| 2006/0023651 A1 | 2/2006 | Tsuchiuchi | |
| 2007/0067438 A1* | 3/2007 | Goranson | H04L 63/1425 709/224 |
| 2009/0067846 A1* | 3/2009 | Yu | H04B 10/1143 398/128 |
| 2010/0162392 A1 | 6/2010 | Jeong | |
| 2011/0007901 A1* | 1/2011 | Ikeda | H04N 1/00891 380/270 |
| 2012/0023554 A1* | 1/2012 | Murgia | H04L 63/20 726/4 |
| 2016/0099969 A1* | 4/2016 | Angus | H04L 63/0823 713/158 |
| 2016/0341128 A1* | 11/2016 | Juarez Becerril | F02N 11/0803 |
| 2017/0085577 A1 | 3/2017 | Wise | |
| 2017/0134182 A1* | 5/2017 | Davis | H04Q 9/00 |
| 2017/0156110 A1* | 6/2017 | Ueno | H04N 1/32791 |
| 2017/0289191 A1* | 10/2017 | Thioux | H04L 63/1441 |
| 2018/0107596 A1* | 4/2018 | Kelly | G06F 11/073 |
| 2018/0213002 A1 | 7/2018 | Figovsky | |
| 2019/0205557 A1 | 7/2019 | Kurian | |
| 2019/0303354 A1 | 10/2019 | Zamir | |
| 2019/0327086 A1 | 10/2019 | Slowik | |
| 2019/0334928 A1 | 10/2019 | Sela | |
| 2019/0386969 A1 | 12/2019 | Verzun | |
| 2020/0012799 A1 | 1/2020 | Breuer | |
| 2020/0137055 A1* | 4/2020 | Isola | H04L 63/101 |

OTHER PUBLICATIONS

Mell, Peter et al.; "The NIST Definition of Cloud Computing;" National Institute of Standards and Technology; Special Publication 800-145; Sep. 2011; 7 pages.

Etigowni, Sriharsha et al.; Cyber-Air-Gapped Detection Of Controller Attacks Through Physical Interdependencies; IEEE International Conference on Smart Grid Communications (SmartGridComm); Oct. 23-27, 2017; 6 pages.

Guri, Mordechai et al.; PowerHammer : Exfiltrating Data From Air-Gapped Computers Through Power Lines; IEEE Transactions on Information Forensics and Security (vol. 15); Nov. 7, 2019; pp. 1879-1890.

Guri, Mordechai; et al. AirHopper: Bridging The Air-Gap Between Isolated Networks And Mobile Phones Using Radio Frequencies; 9th International Conference on Malicious and Unwanted Software: The Americas (MALWARE); Oct. 28-30, 2014; 10 pages.

Li, Xiaolei et al.; DroidVault: A Trusted Data Vault For Android Devices; 19th International Conference on Engineering of Complex Computer Systems; Aug. 4-7, 2014; 10 pages.

Wang, Qi et al.; Charting The Attack Surface Of Trigger-Action IoT Platforms; ACM SIGSAC Conference Communications Security; Nov. 2019; pp. 1439-1453.

* cited by examiner

DEVICE CONNECTIVITY POWER CONTROL

BACKGROUND

The present invention relates generally to a method for controlling power with respect to device connectivity and in particular to a method and associated system for improving power control technology associated with enabling and disabling power for devices such as servers, storage, network hardware connections for controlling access to data.

SUMMARY

A first aspect of the invention provides a power control connectivity method comprising: scheduling, by a processor of a controller, a copy function associated with copying data from a production hardware device to a secure hardware device at a specified time period; first disabling during said specified time period, by said processor via a first network switch, a first hardware connection between said production hardware device and a production network associated with said production hardware device; first enabling, by said processor via a second network switch, a second hardware connection between said production hardware device and said secure hardware device; enabling, by said processor in response to said enabling said second hardware connection, said copy function for copying said data from said production hardware device to said secure hardware device; second disabling after said copying said data has completed, by said processor via said second network switch, said second hardware connection between said production hardware device and said secure hardware device; and second enabling, by said processor in response to said disabling said second hardware connection, said first hardware connection between said production hardware device and said production network.

A second aspect of the invention provides a computer program product, comprising a computer readable hardware storage device storing a computer readable program code, said computer readable program code comprising an algorithm that when executed by a processor of a controller implements a power control connectivity method, said method comprising: scheduling, by said processor, a copy function associated with copying data from a production hardware device to a secure hardware device at a specified time period; first disabling during said specified time period, by said processor via a first network switch, a first hardware connection between said production hardware device and a production network associated with said production hardware device; first enabling, by said processor via a second network switch, a second hardware connection between said production hardware device and said secure hardware device; enabling, by said processor in response to said enabling said second hardware connection, said copy function for copying said data from said production hardware device to said secure hardware device; second disabling after said copying said data has completed, by said processor via said second network switch, said second hardware connection between said production hardware device and said secure hardware device; and second enabling, by said processor in response to said disabling said second hardware connection, said first hardware connection between said production hardware device and said production network.

A third aspect of the invention provides a controller comprising a processor coupled to a computer-readable memory unit, said memory unit comprising instructions that when executed by the processor implements a power control connectivity method comprising scheduling, by said processor, a copy function associated with copying data from a production hardware device to a secure hardware device at a specified time period; first disabling during said specified time period, by said processor via a first network switch, a first hardware connection between said production hardware device and a production network associated with said production hardware device; first enabling, by said processor via a second network switch, a second hardware connection between said production hardware device and said secure hardware device; enabling, by said processor in response to said enabling said second hardware connection, said copy function for copying said data from said production hardware device to said secure hardware device; second disabling after said copying said data has completed, by said processor via said second network switch, said second hardware connection between said production hardware device and said secure hardware device; and second enabling, by said processor in response to said disabling said second hardware connection, said first hardware connection between said production hardware device and said production network.

The present invention advantageously provides a simple method and associated system capable of accurately controlling power with respect to device connectivity.

DETAILED DESCRIPTION

Figure 1:
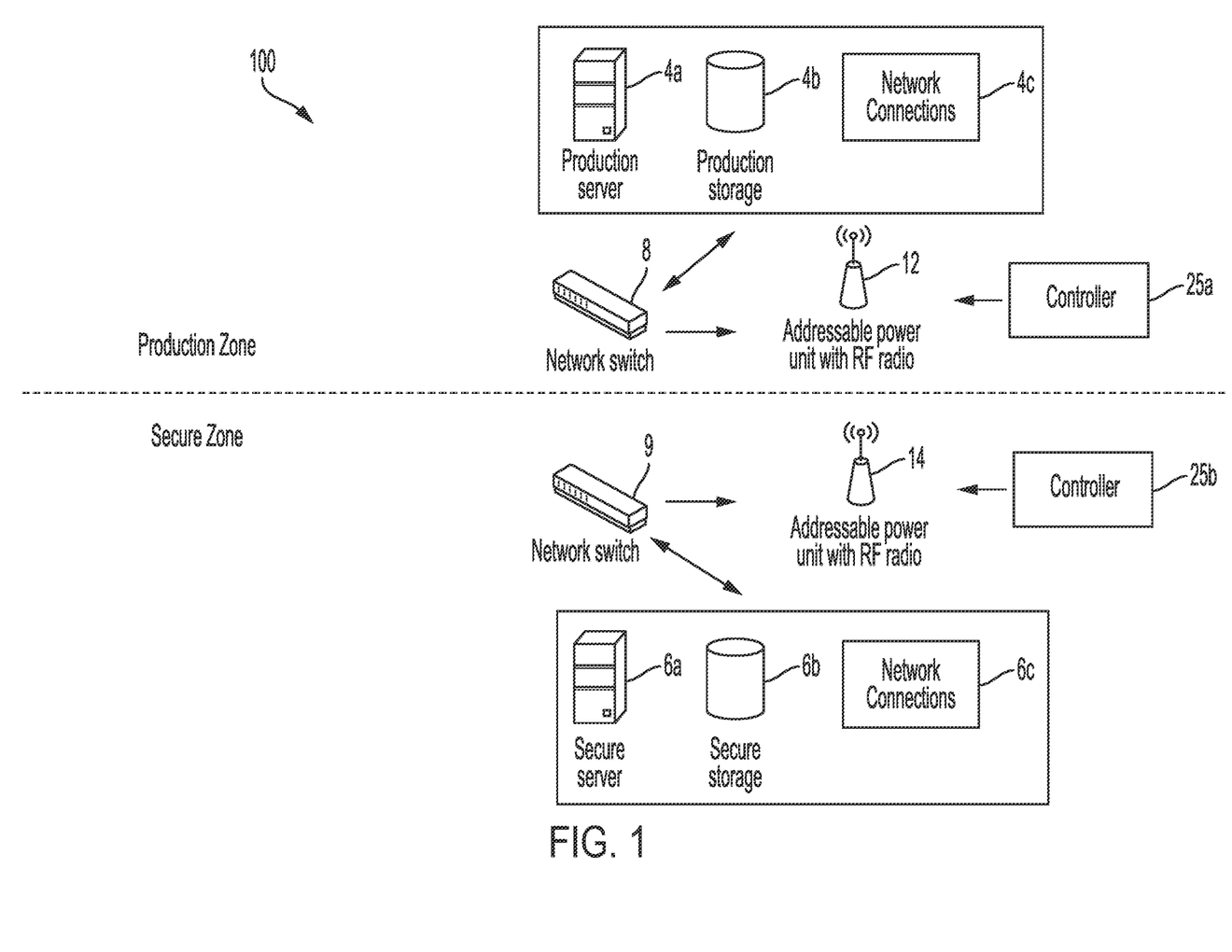
FIG. 1 illustrates a system for improving power control technology associated with enabling and disabling power for hardware device hardware connections for controlling access to data, in accordance with embodiments of the present invention.

FIG. 1 illustrates a system 100 for improving power control technology associated with enabling and disabling power for hardware device hardware connections for controlling access to data, in accordance with embodiments of the present invention. Hardware device may comprise devices such as, inter alia, servers, storage, network hardware connections, etc. for controlling access to data. Typical global cyber events cause many organizations to transfer data to a secure data vault using a scheduled network gap method to transmit the data and disconnect network connectivity from a target secure data bunker. Likewise, typical gap systems enable a software approach for deactivating or de-routing network switch ports. The typical software approach maintains a physical connection to an active network device that may be connected to additional active network devices. A physical connection may allow unauthorized access to the target source bunker and/or network devices. Therefore, system 100 enables a hardware gap (e.g., airgap) process utilizing power disruption for physically disconnecting (i.e., via hardware) devices such that the networking, storage, or server devices are forced offline and all communication links are disconnected via power management. System 100 comprises an event driven data transmission system enabling a data vault infrastructure and associated devices to power up during usage validation such as, inter alia, data transmission, etc. Likewise, specified devices are disabled (i.e., powered off) thereby preventing communication with additional electronic devices on a network thereby enabling a secure (air) gapping system for protecting critical data.

System 100 comprises an electrical power-based (airgap) system providing an air gap via usage of hardware available within a man trap system and or a data vault as per need basis. A mantrap is defined herein as a small room or vestibule with two doors designed to "trap" an individual before he or she is cleared to enter a secure location. For example, a security guard may enable access or the individual may use verification technology such as, inter alia, a card reader, a PIN code, a fingerprint scan, etc. to gain access to the secure location. A default state of system 100 comprises a power off state to avoid exposures from vulnerabilities within a data transmission infrastructure. Therefore, the vulnerabilities which can be used to extract data (e.g., powered on sound grids, heat thermal sensing, network hardware out of band management systems, etc.) are not powered on and therefore may not be breached. System 100 is configured to power up a minimal infrastructure during data transaction transmissions such that a power management device control process is implemented. Disabling power from device prevents devices from being compromised thereby securing private or sensitive data.

System 100 may include a band management Internet Protocol (IP) network connected to IP power strips or power distribution (PDU) devices which may be configured to power off network switches, computers, and storage devices. Connectivity to the IP power strips and PDU devices may be associated with out of band signaling and radio frequency transmission. System 100 is configured to issue commands to IP power devices and disconnect from out of band/isolated communication channels.

System 100 of FIG. 1 includes a production server 4a and/or a production storage device 4b and/or network hardware connections 4c (i.e., dedicated physical specialized hardware device) and a secure server 6a and/or a secure storage device 6b and/or network hardware connections 6c (i.e., dedicated physical specialized hardware device) interconnected through network switches 8 and 9. Additionally, system 100 comprises controllers 25a and 25b for controlling/addressing addressable power sources 12 and 14. Controllers 25a and 25b may comprise a same or differing controllers. Power to network switch 8 is controlled via controller 25a addressing addressable power source (comprising radio frequency (RF) communications) 12 and is associated with a production zone of system 100. Power to network switch 9 is controlled via controller 25b addressing addressable power source (comprising radio frequency (RF) communications) 14 and is associated with a secure zone of system 100. Production server 4a, production storage device 4b, network hardware connections 4c, production server 6a, production storage device 6b, and/or network hardware connections 6c may each include, inter alia, a computing device, a specialized server, a dedicated hardware device, etc. Production server 4a, production storage device 4b, network hardware connections 4c, production server 6a, production storage device 6b, and/or network hardware connections 6c may be Bluetooth enabled to provide connectivity to any type of system. Production server 4a, production storage device 4b, network hardware connections 4c, production server 6a, production storage device 6b, network hardware connections 6c, addressable power source 12, and addressable power source 14 each include specialized circuitry/software. Production server 4a, production storage device 4b, network hardware connections 4c, production server 6a, production storage device 6b, network hardware connections 6c, addressable power source 12, and addressable power source 14 may each comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, production server 4a, production storage device 4b, network hardware connections 4c, production server 6a, production storage device 6b, network hardware connections 6c, addressable power source 12, and addressable power source 14 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving power control technology associated with enabling and disabling power for server hardware connections for controlling access to servers. Network switches 8 and 9 may be associated with any type of network including, inter alia, a 5G telecom network, a local area network, (LAN), a wide area network (WAN), the Internet, a wireless network, etc. Alternatively, network switches 8 and 9 may be associated with an application programming interface (API).

System 100 is configured to reduce datacenter cyberattacks by externally disconnecting (via an RF control signal) a power source for an idle data server. For example, RF out-of-band network properties prevent ultra-high frequencies from penetrating through data center walls thereby presenting a much lower attack surface than ethernet based control signals. Additionally, system 100 enables communication components to only power on during data transmission processes. For example (with respect to replicating protected backup/replica data), system 100 supplies power for a memory function without supplying power to a computing function. Alternatively, a storage and computing function are supplied with power to run forensics with respect to replicated data via a storage area network (SAN) fabric. A schedule to supply power on devices for running forensics with respect to copying may be scheduled by, inter alia, waiting for a specific number of days to ensure that no data vulnerabilities exist before copying to a clean room. Production server 4a, production storage device 4b, network hardware connections 4c, production server 6a, production storage device 6b, and/or network hardware connections 6c may be enabled as follows:

1. Cold—Production server 4a, production storage device 4b, network hardware connections 4c, production server 6a, production storage device 6b, and/or network hardware connections 6c are never enabled and all scans are performed with respect to dark data.
2. Warm—Production server 4a, production storage device 4b, network hardware connections 4c, secure server 6a, secure storage device 6b, and/or network hardware connections 6c are enabled for a short time frame for data dumping or extraction and then they are disabled. Scans are performed with respect to the dumped or extracted data.
3. Hot—Production server 4a, production storage device 4b, network hardware connections 4c, secure server 6a, secure storage device 6b, and/or network hardware connections 6c are enabled for an entire duration of the scans.

System 100 executes the following functionality for enabling power control based on radio frequency (RF) connectivity for managing specified devices based on production data transmission intervals:

1. Controlling data access such that a production zone is not connected to a man trap switching network simultaneously with a secure zone (e.g., a data vault).
2. Ensuring that man trap and data vault devices are supplied with power at a same time.
3. Supplying power to devices necessary to enable a man trap infrastructure to copy data from the production zone. Additionally, forensics can be run with respect to data within the man trap and minimal devices are powered to manually test specific data sets.
4. Transferring clean data to a data vault (when the data is deemed clean) while only powering on infrastructure switches and storage devices.
5. Disconnecting an RF device and allowing a connection (via a jump server) to a production network only when all gapped systems are powered down.
6. Ensuring that a jump server is designed to boot from read-only media and is associated with an uptime of less than two hours to minimize a possible attack surface.

Figure 2:
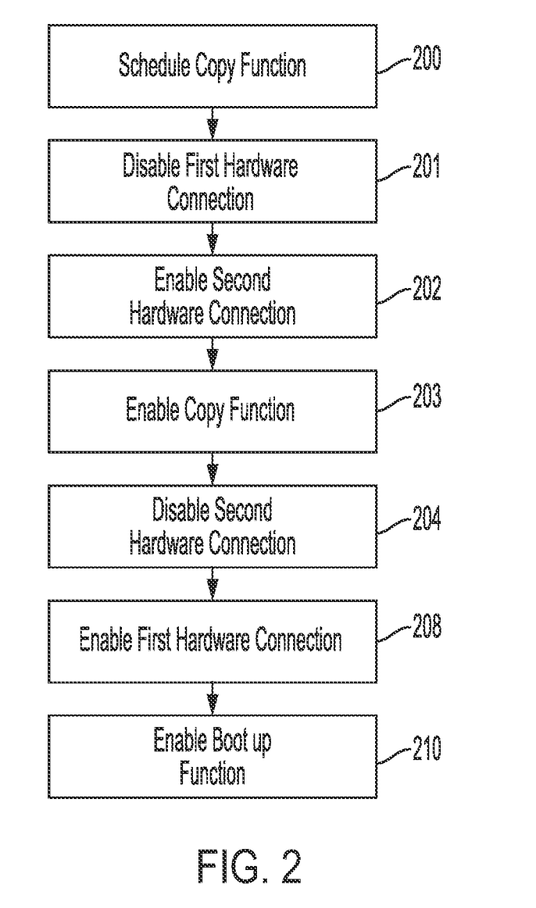
FIG. 2 illustrates an algorithm detailing a process flow enabled by the system of FIG. 1 for improving power control technology associated with enabling and disabling power for hardware device hardware connections for controlling access to data, in accordance with embodiments of the present invention.

FIG. 2 illustrates an algorithm detailing a process flow enabled by system 100 of FIG. 1 for improving power control technology associated with enabling and disabling power for hardware device hardware connections for controlling access to data, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by production server 4a, production storage device 4b, network hardware connections 4c, secure server 6a, secure storage device 6b, network hardware connections 6c, addressable power source 12, addressable power source 14, and network switches 8 and 9. In step 200, a copy function associated with copying data from a production server to a secure server (or any type of hardware device at a specified time period) is scheduled by a controller. In step 201, a first hardware connection between the production server and a production network (associated with the production server) is disabled (via a first network switch) during the specified time period. Disabling the first hardware connection may include:

1. Detecting a power state change requirement for a first power source for the first network switch.
2. Retrieving an encryption key and an associated ID for accessing the first power source for the first network switch.
3. Transmitting the encryption key and the associated ID to the first power source for the first network switch.
4. Receiving (from the first power source for the first network switch) verification indicating receipt of the encryption key and the associated ID resulting in disabling (e.g., via an addressable radio frequency control signal) the first power source for disabling the first network switch for executing disabling the first hardware connection.

In step 202, a second hardware connection between the production server and the secure server is enabled via a second network switch. Enabling the second hardware connection may include:

1. Detecting a power state change requirement for a second power source for the second network switch.
2. Retrieving an encryption key and an associated ID for accessing the second power source for the second network switch.
3. Transmitting the encryption key and the associated ID to the second power source for the second network switch.
4. Receiving (from the second power source for the second network switch) verification indicating receipt of the encryption key and the associated ID resulting in enabling (e.g., via an addressable radio frequency control signal) the second power source for enabling the second network switch for executing enabling the second hardware connection.

In step 203, the copy function is enabled (in response to step 202) for copying the data from the production storage and server to the secure storage and server. In step 204 (after step 203 has completed), the second hardware connection between the production storage and server and the secure storage and server is disabled (e.g., via an addressable radio frequency control signal). Disabling the second hardware connection may include:

1. Detecting a power state change requirement for a second power source for the second network switch.
2. Retrieving an encryption key and an associated ID for accessing the second power source for the second network switch.
3. Transmitting the encryption key and the associated ID to the second power source for the second network switch.
4. Receiving (from the second power source for the second network switch) verification indicating receipt of the encryption key and the associated ID resulting in disabling the second power source for disabling the second network switch for executing disabling the second hardware connection.

In step 208, the first hardware connection between the production server and the production network is enabled (e.g., via an addressable radio frequency control signal) to resume operational functionality. Enabling the first hardware connection may include:

1. Detecting a power state change requirement for a first power source for the first network switch.
2. Retrieving an encryption key and an associated ID for accessing the first power source for the first network switch.
3. Transmitting the encryption key and the associated ID to the first power source for the first network switch.

4. Receiving (from the first power source for the first network switch) verification indicating receipt of the encryption key and the associated ID resulting in enabling power to the first power source for the second network switch for executing enabling the first hardware connection.

In step 210, the controller is enabled for booting up and executing the copy function (of step 203) via a read only media source.

Figure 3:
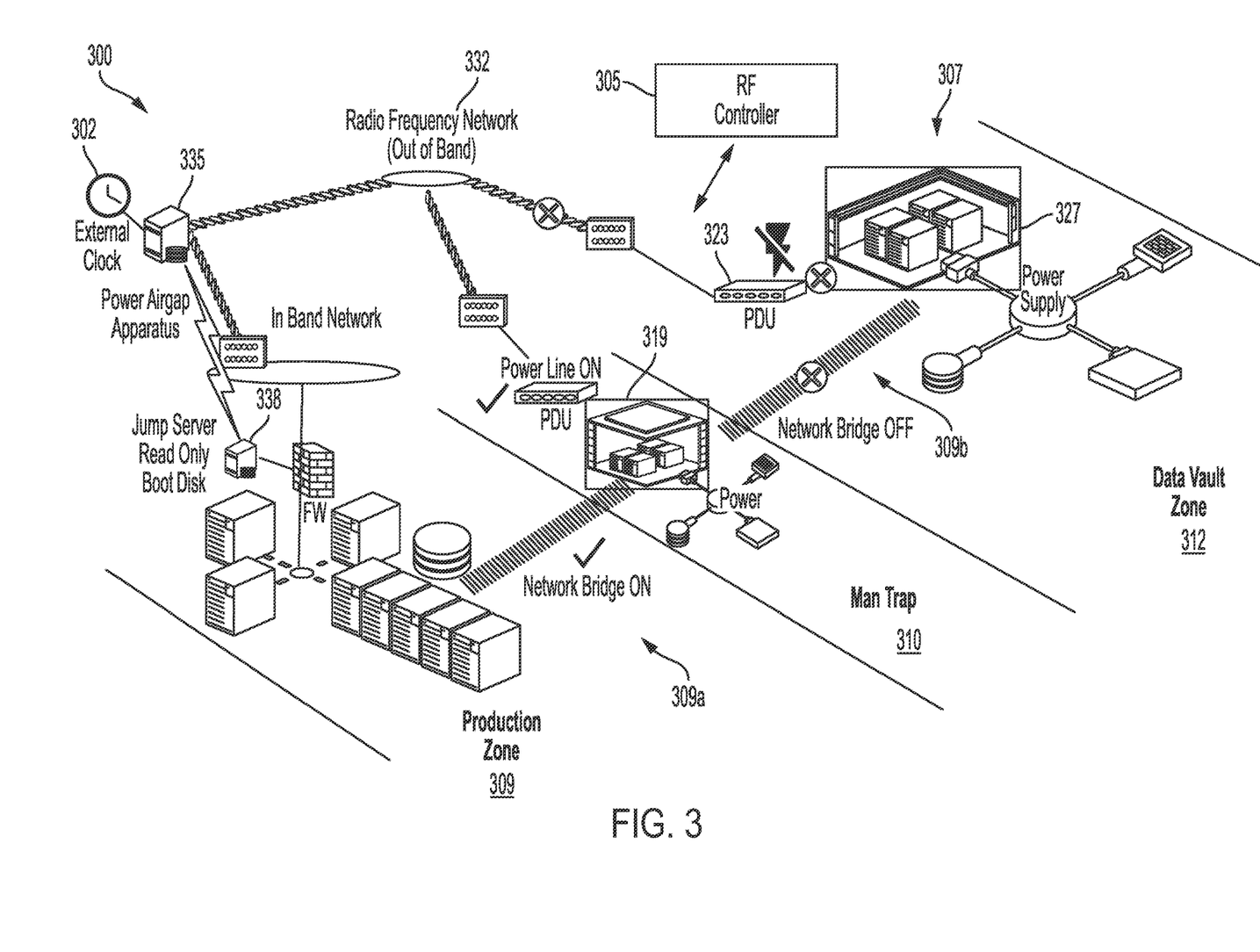
FIG. 3 illustrates a structural view of a power airgap system, in accordance with embodiments of the present invention.

FIG. 3 illustrates a structural view of a power airgap system 300, in accordance with embodiments of the present invention. Power airgap system 300 is communicatively connected to a redundant external clock 302 for time validation purposes. Power airgap system 300 includes a power airgap apparatus 335 associated with an RF controller 305 configured to utilize high-frequencies (e.g., greater than 5 Ghz) and low-power to minimize transmissions from escaping form a physical room 307. Additionally, RF controller 305 is configured to utilize complex key-based encryption techniques to validate authenticity for authorizing power control functionality. Power airgap apparatus 335 is additionally configured to open draw bridges 309a and 309b for controlling access such that a production zone 309 is not connected to a man trap 310 infrastructure simultaneously while man trap infrastructure 310 is connected to data vault zone 312. Therefore, power airgap system 300 (comprising a gatekeeper machine 319 opening and closing draw bridges 309a and 309b) ensures that production zone 309 is unable to access physical room 307 (e.g., a cleanroom). Likewise, all man trap and data vault devices are not powered on at a same time. For example, with respect to a process for replicating backup protected backup/replica data, infrastructure switches and associated storage devices are required to be powered without executing a computational process. With respect to a further example, only storage and computer devices are powered on to run forensics manually with respect to copy data, while switches are powered off.

Power control devices 323 within a datacenter (data vault zone 312) for powering devices 327 are configured to utilize RF or additional out of band connectivity (e.g., radio frequency network 332) for enabling command and control.

Power airgap apparatus 335 includes gate keeper control capabilities for communicating with out of band connected power interrupters. Therefore, power airgap apparatus 335 is configured to only power devices for enabling man trap infrastructure 310 to copy data from production zone 309. Manually testing and forensics processes may be run with respect to data within man trap infrastructure 310 simultaneously with powered minimal devices for testing specific data sets.

Power airgap apparatus 335 is configured to disconnect itself via RF processes thereby preventing a gatekeeper from being externally comprised. Access to the gatekeeper is available via physical console during a scheduled window at which time the power airgap apparatus 335 initiates connection to production zone 309 via a jump server 338 during a gapped system power down.

Jump server 338 is designed to boot up from a read-only media and may be required to enable an uptime of greater than two hours to minimize a possible attack surface. A boot media may expire on a regular basis to match key expirations.

Figure 4:
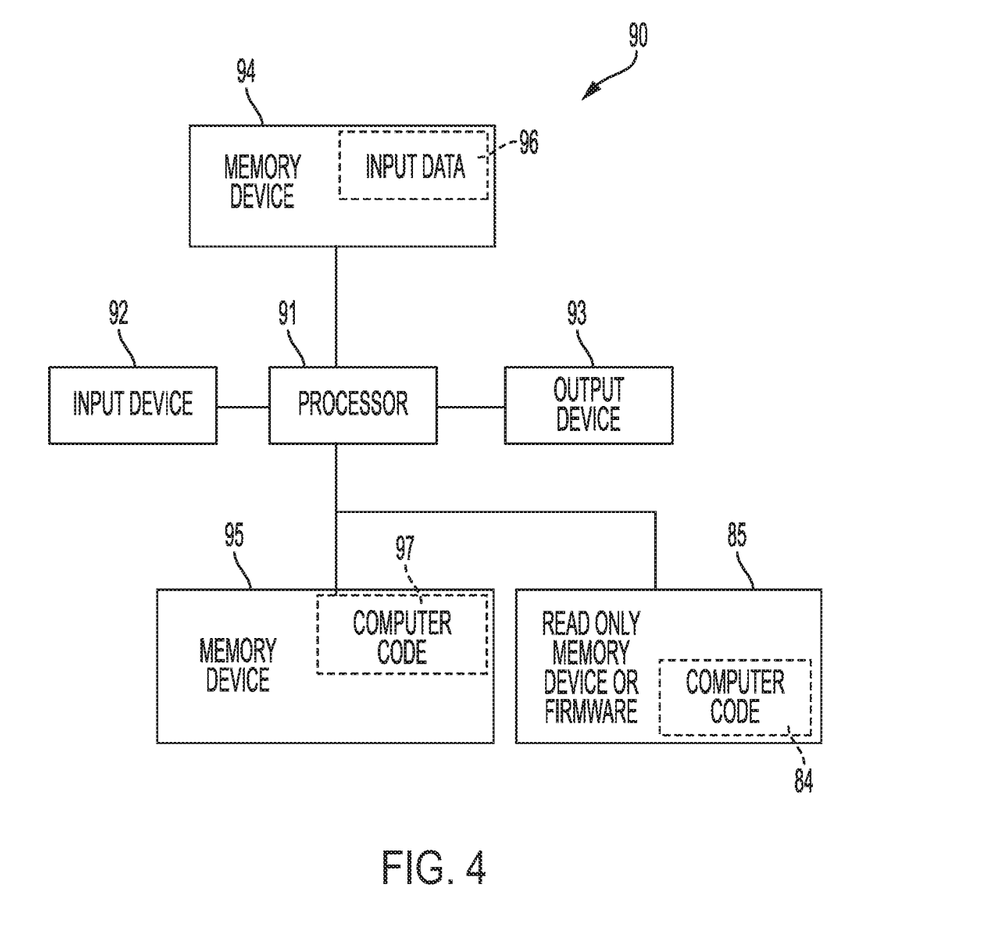
FIG. 4 illustrates a computer system used by the system of FIG. 1 for improving power control technology associated with enabling and disabling power for hardware device hardware connections for controlling access to data, in accordance with embodiments of the present invention.

FIG. 4 illustrates a computer system 90 (e.g., production server 4a, production storage device 4b, network hardware connections 4c, secure server 6a, secure storage device 6b, network hardware connections 6c, and/or controllers 25a and 25b of FIG. 1) used by or comprised by the system of FIG. 1 for improving power control technology associated with enabling and disabling power for hardware device hardware connections for controlling access to data, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, a network device 72 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving power control technology associated with enabling and disabling power for hardware device hardware connections for controlling access to data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device). The networking device 72 is a device designed to communicate with other computer systems over networks commonly known as local area networks, wide area networks, campus area networks, and metropolitan area networks, using physical links such as, inter alia, wired, optical, or wireless, using data link protocols such as TCP/IP, UDP, ATM, Frame Relay, etc.

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve power control technology associated with enabling and disabling power for hardware device hardware connections for controlling access to data. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving power control technology associated with enabling and disabling power for hardware device hardware connections for controlling access to data. In another embodiment, the invention provides a business method that performs the process steps of the invention on a subscription, advertising, and/or fee basis. That is, a service supplier, such as a Solution Integrator, could offer to enable a process for improving power control technology associated with enabling and disabling power for hardware device hardware connections for controlling access to data. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a configuration of hardware and software, any configuration of hardware and software, as would be known to a person of ordinary skill in the art, may be utilized for the purposes stated supra in conjunction with the computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
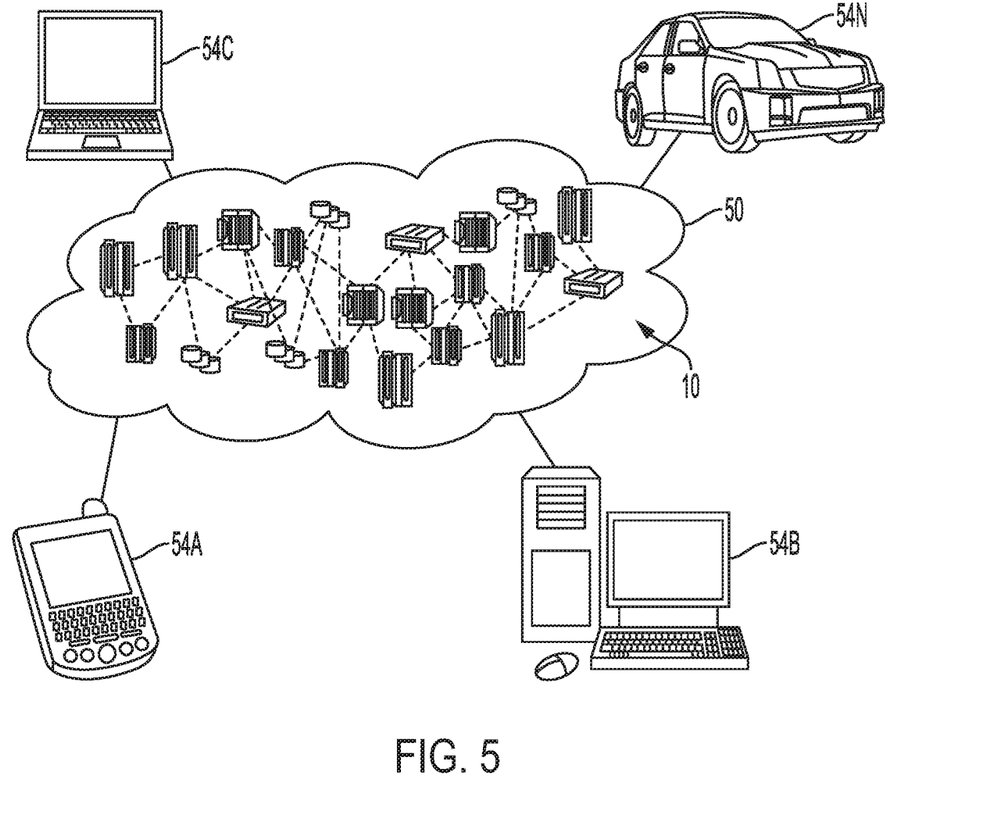
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
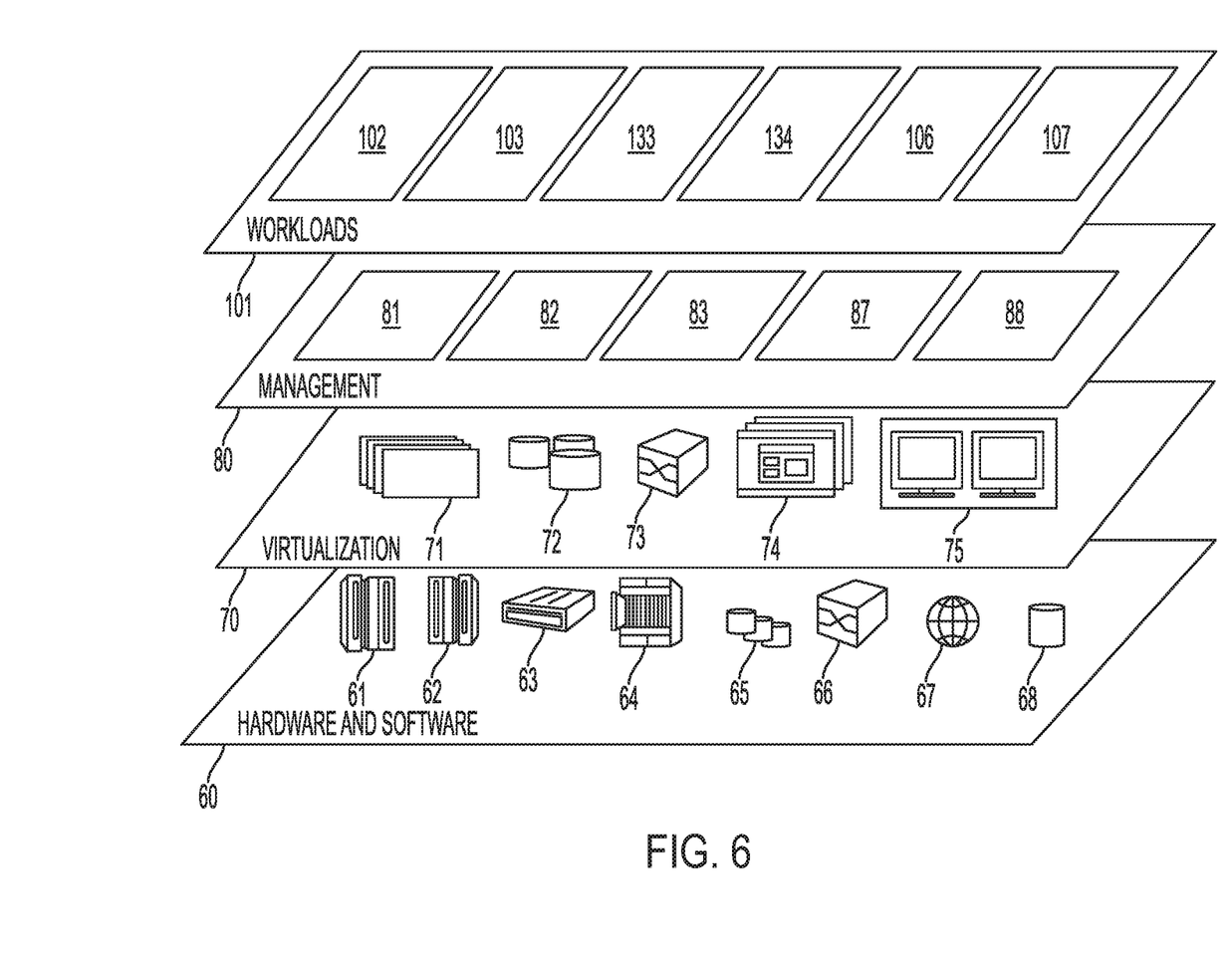
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving power control technology associated with enabling and disabling power for hardware device hardware connections for controlling access to data 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A power control connectivity method comprising:
scheduling, by a processor of a controller, a copy function associated with copying data from a production hardware device to a secure hardware device at a specified time period;
first disabling during said specified time period, by said processor via a first network switch, a first hardware connection between said production hardware device and a production network associated with said production hardware device by disabling said first network switch;
first enabling, by said processor via a second network switch during said specified time period, a second hardware connection between said production hardware device and said secure hardware device, wherein said first enabling includes transmitting authentication information to a second power source for said second network switch;
receiving, from said second power source, verification indicating receipt of said authentication information resulting in enabling said second power source for enabling said second network switch for executing said first enabling;
enabling, by said processor in response to said enabling said second hardware connection, said copy function for copying said data from said production hardware device to said secure hardware device during said specified time period;
second disabling after said copying said data has completed, by said processor via said second network switch, said second hardware connection between said production hardware device and said secure hardware device;
second enabling, by said processor in response to said disabling said second hardware connection, said first hardware connection between said production hardware device and said production network; and
causing forensics to be run on said data stored to said secure hardware device, wherein the forensics are run during a time when said first and second network switches are both powered off.

2. The method of claim 1, wherein said first disabling comprises:
detecting a power state change requirement for a first power source for said first network switch;
retrieving an encryption key and an associated ID for accessing said first power source for said first network switch;
transmitting said encryption key and said associated ID to said first power source for said first network switch; and
receiving from said first power source for said first network switch, verification indicating receipt of said encryption key and said associated ID resulting in disabling said first power source for disabling said first network switch for executing said first disabling.

3. The method of claim 1, wherein said first enabling comprises:
enabling a second power source for providing power to said second network switch, wherein said first enabling includes transmitting authentication information to a second power source for said second network switch; and receiving, from said second power source, verification indicating receipt of said authentication information resulting in enabling said second power source for enabling said second network switch for executing said first enabling.

4. The method of claim 1, wherein said first network switch and said second network switch are prevented from being powered on simultaneously for isolating the production network from the secure hardware device.

5. The method of claim 1, wherein said first disabling, said first enabling, said second disabling, and said second enabling are executed via an addressable radio frequency control signal to at least one addressable power unit configured to power off said first network switch during the first disabling and the second network switch during said second disabling.

6. The method of claim 1, further comprising:
enabling, by said processor, said controller for booting up from boot media on a read only media source, wherein said boot media on said read only media source expires according to a key expiration.

7. The method of claim 1, wherein power is supplied to a memory function of said production hardware device during said copying of said data from said production hardware device to said secure hardware device, wherein power is not supplied to a computing function of said production hardware device during said copying of said data from said production hardware device to said secure hardware device.

8. A computer program product, comprising a computer readable hardware storage device storing a computer readable program code, said computer readable program code comprising an algorithm that when executed by a processor of a controller implements a power control connectivity method, said method comprising:

scheduling, by said processor, a copy function associated with copying data from a production hardware device to a secure hardware device at a specified time period;

first disabling during said specified time period, by said processor via a first network switch, a first hardware connection between said production hardware device and a production network associated with said production hardware device by disabling said first;

first enabling, by said processor via a second network switch, a second hardware connection between said production hardware device and said secure hardware device, wherein said first enabling includes transmitting authentication information to a second power source for said second network switch;

enabling, by said processor in response to said enabling said second hardware connection, said copy function for copying said data from said production hardware device to said secure hardware device;

second disabling after said copying said data has completed, by said processor via said second network switch, said second hardware connection between said production hardware device and said secure hardware device by disabling said second network switch;

second enabling, by said processor in response to said disabling said second hardware connection, said first hardware connection between said production hardware device and said production network; and causing forensics to be run on said data stored to said secure hardware device, wherein the forensics are run during a time when said first and second network switches are both powered off.

9. The computer program product of claim 8, comprising running forensics on said data stored to said secure hardware device, wherein power is supplied to a computing function of said secure hardware device during running of said forensics, wherein said forensics are run during a time when said first and second network switches are both powered off.

10. The computer program product of claim 8, wherein power is supplied to a memory function of said production hardware device during said copying of said data from said production hardware device to said secure hardware device, wherein power is not supplied to a computing function of said production hardware device during said copying of said data from said production hardware device to said secure hardware device.

11. The computer program product of claim 10, comprising causing forensics to be run on said data stored to said secure hardware device, wherein power is supplied to said computing function of said secure hardware device during running of said forensics, wherein the forensics are run during a time when said first and second network switches are both powered off.

12. The computer program product of claim 8, wherein said second enabling comprises:

detecting a power state change requirement for a first power source for said first network switch;

retrieving an encryption key and an associated ID for accessing said first power source for said first network switch;

transmitting said encryption key and said associated ID to said first power source for said first network switch; and receiving from said first power source for said first network switch, verification indicating receipt of said encryption key and said associated ID resulting in enabling power to said first power source for said first network switch for executing said second enabling.

13. The computer program product of claim 8, wherein said first disabling, said first enabling, said second disabling, and said second enabling are executed via an addressable radio frequency control signal.

14. The computer program product of claim 8, wherein said method further comprises:

enabling, by said processor, said controller for booting up and executing said copy function via a read only media source.

15. A controller product comprising a hardware processor coupled to a computer-readable memory unit, said memory unit comprising instructions that, when executed by the processor, implement a power control connectivity method comprising:

scheduling, by said processor, a copy function associated with copying data from a production hardware device to a secure hardware device at a specified time period;

first disabling during said specified time period, by said processor via a first network switch, a first hardware connection between said production hardware device and a production network associated with said production hardware device by disabling said first network switch;

first enabling, by said processor via a second network switch, a second hardware connection between said production hardware device and said secure hardware device, wherein said first enabling includes transmitting authentication information to a second power source for said second network switch;

receiving, from said second power source, verification indicating receipt of said authentication information resulting in enabling said second power source for enabling said second network switch for executing said first enabling;

enabling, by said processor in response to said enabling said second hardware connection, said copy function for copying said data from said production hardware device to said secure hardware device;

second disabling after said copying said data has completed, by said processor via said second network switch, said second hardware connection between said production hardware device and said secure hardware device by disabling said second network switch;

second enabling, by said processor in response to said disabling said second hardware connection, said first hardware connection between said production hardware device and said production network; and causing forensics to be run on said data stored to said secure hardware device, wherein the forensics are run during a time when said first and second network switches are both powered off.

16. The controller product of claim 15, wherein power is supplied to a memory function of said secure hardware device during said copying of said data from said production hardware device to said secure hardware device, wherein power is not supplied to a computing function of said secure hardware device during said copying of said data from said production hardware device to said secure hardware device.

17. The controller product of claim 15, wherein said first enabling comprises:
    detecting a power state change requirement for said second power source for said second network switch;
    retrieving said authentication information, said authentication information including an encryption key and an associated ID for accessing said second power source for said second network switch;
    transmitting said encryption key and said associated ID to said second power source for said second network switch; and
    receiving from said second power source for said second network switch, verification indicating receipt of said encryption key and said associated ID resulting in enabling said second power source for enabling said second network switch for executing said first enabling.

18. The controller product of claim 15, wherein said second disabling comprises:
    detecting a power state change requirement for said second power source for said second network switch;
    retrieving an encryption key and an associated ID for accessing said second power source for said second network switch;
    transmitting said encryption key and said associated ID to said second power source for said second network switch; and
    receiving from said second power source for said second network switch, verification indicating receipt of said encryption key and said associated ID resulting in disabling power to said second power source for disabling said second network switch for executing said second disabling.

19. The controller product of claim 15, wherein said second enabling comprises:
    detecting a power state change requirement for a first power source for said first network switch;
    retrieving an encryption key and an associated ID for accessing said first power source for said first network switch;
    transmitting said encryption key and said associated ID to said first power source for said first network switch; and
    receiving from said first power source for said first network switch, verification indicating receipt of said encryption key and said associated ID resulting in enabling power to said first power source for said first network switch for executing said second enabling.

20. The method of claim 2, wherein power is supplied to a memory function of said secure hardware device during said copying of said data from said production hardware device to said secure hardware device, wherein power is not supplied to a computing function of said secure hardware device during said copying of said data from said production hardware device to said secure hardware device; and further comprising running forensics on said data stored to said secure hardware device, wherein power is supplied to said computing function of said secure hardware device during running of said forensics, wherein the forensics are run during a time when said first and second network switches are both powered off.

* * * * *